(12) United States Patent
Nuyen et al.

(10) Patent No.: US 7,152,199 B2
(45) Date of Patent: Dec. 19, 2006

(54) METHOD AND APPARATUS FOR DELINEATING DATA IN AN FEC-CODED ETHERNET FRAME

(75) Inventors: Hung C. Nuyen, Rohnert Park, CA (US); Glen Kramer, Pctaluma, CA (US); Ryan E. Hirth, Windsor, CA (US)

(73) Assignee: Teknovus, Inc., Petaluma, CA (US)

( * ) Notice: Subject to any disclaimer, the term of this patent is extended or adjusted under 35 U.S.C. 154(b) by 246 days.

(21) Appl. No.: 10/866,399

(22) Filed: Jun. 12, 2004

(65) Prior Publication Data

US 2005/0271053 A1  Dec. 8, 2005

Related U.S. Application Data

(60) Provisional application No. 60/576,751, filed on Jun. 2, 2004.

(51) Int. Cl.
   *H03M 13/00*   (2006.01)
(52) U.S. Cl. ....................... 714/776; 714/777
(58) Field of Classification Search ......... 714/776–777
   See application file for complete search history.

(56) References Cited

U.S. PATENT DOCUMENTS 5,956,102 A * 9/1999 Lane ....................... 348/425.4

FOREIGN PATENT DOCUMENTS

WO   WO03/092207 A1   4/2002

OTHER PUBLICATIONS

"Extensions of the Reconciliation Sublayer (RS) and Physical Coding Sublayer (PCS)/ Physical Media Attacment (PMA) for 1000BSE-X for Multi-Point Links and Forward Error Correction", IEEE Draft P802.3ah, Apr. 19, 2004, copyright 2004 IEEE, pp. 528 to 558.
"Physical Coding Sublayer (PCS) and Physical Medium Attachment (PMA) sublayer, type 1000BASE-X", Local and Metropolitan Area Networks, IEEE Std. 802.3-2002, Section Three, copyright 2002 IEEE, pp. 32 to 78.

* cited by examiner

*Primary Examiner*—Guy J. Lamarre
(74) *Attorney, Agent, or Firm*—Park, Vaughan & Fleming; Shun Yao

(57) ABSTRACT

One embodiment of the present invention provides a system that facilitates construction of a forward error correction (FEC) coded Ethernet frame. The system generates a number of FEC parity bits for the conventional Ethernet frame and inserts a start sequence before the conventional Ethernet frame. Next, the system appends an even- or odd-delimiter to the conventional Ethernet frame. The even-delimiter and the odd-delimiter are selected such that there is a sufficiently large Hamming distance between them, thereby reducing the probability of mistaking the even-delimiter for the odd-delimiter, or mistaking the odd-delimiter for the even-delimiter, if bit error occurs.

30 Claims, 5 Drawing Sheets

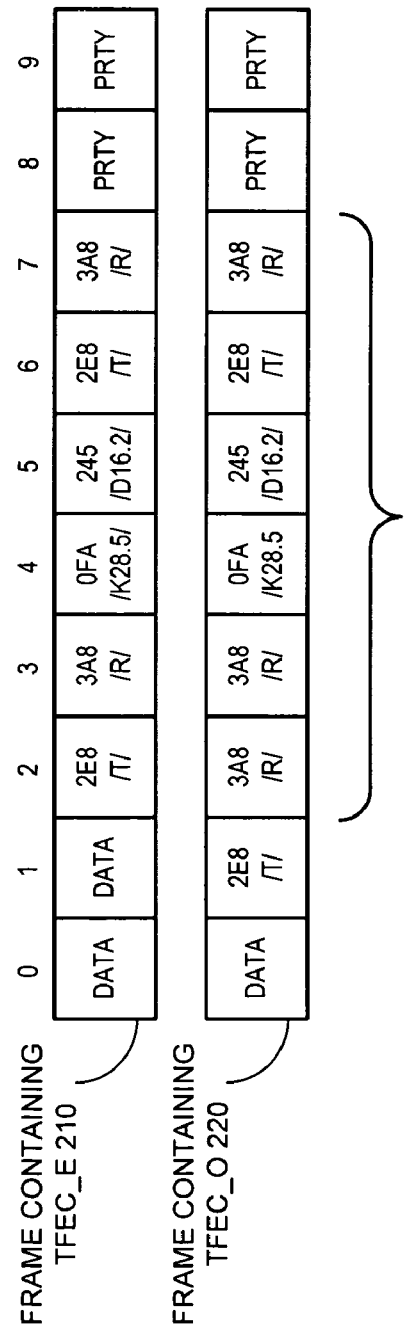

METHOD AND APPARATUS FOR DELINEATING DATA IN AN FEC-CODED ETHERNET FRAME

RELATED APPLICATION

This application hereby claims priority under 35 U.S.C. §119 to U.S. Provisional Patent Application No. 60/576,751 filed on 02 Jun., 2004, entitled "Method for Data Delineation in Ethernet Networks Using Frame-based Forward Error Correction," by inventor Hung C. Nguyen.

BACKGROUND

1. Field of the Invention

The present invention relates to the design of Ethernet. More specifically, the present invention relates to a method and an apparatus for delineating data in an FEC-coded Ethernet frame.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies presently under development, the Ethernet passive optical network (EPON) is one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers.

Using EPONs in the first mile, however, is not without limitations. Because EPONs adopt the passive optical transmission technology, which does not involve amplification or regeneration, the size of a network is subject to power budget and various transmission impairments. Consequently, as a network increases its size, the signal-to-noise ratio suffers, resulting in more frequent bit errors. Fortunately, forward error correction (FEC) can mitigate these undesirable effects and can help increase the power budget.

FEC is an error correction technique wherein a receiving device has the capability to detect and correct any block of symbols that contain fewer than a predetermined number of error symbols. A transmitting device accomplishes FEC by adding bits to each transmitted symbol block, using a predetermined error correction technique. One commonly used technique is to use a Reed-Solomon code. A Reed-Solomon code is specified as RS(l, k) with s-bit symbols, which means that the encoder takes k data symbols of s bits each, and adds (l-k) parity symbols to make an l-symbol codeword. A Reed-Solomon decoder can correct up to t symbols that contain errors in a codeword, where $2t=l-k$. For example, RS(255, 239) with 8-bit symbols means that each codeword contains 255 bytes, of which 239 bytes are data and 8 bytes are parity. The decoder can automatically correct errors contained in up to 8 bytes anywhere in the codeword.

Because FEC coding provides robustness against bit errors, FEC-coded Ethernet frames can survive harsh transmission environment which conventional Ethernet frames may not survive. However, one concern in implementing FEC-coded Ethernet frames is that they should be backward-compatible. That is, non-FEC-enabled equipment should be able to recognize FEC-coded Ethernet frames. For this reason, as proposed in the current IEEE 802.3ah Ethernet in the First Mile standard (hereinafter "IEEE 802.3ah standard), the FEC parity bits for all the blocks of data symbols are aggregated and appended to a conventional Ethernet frame. A delimiter that can be recognized by non-FEC-enabled equipment delineates the conventional Ethernet frame from the parity bits.

Unfortunately, this delimiter is not part of the FEC code and hence is not protected against bit errors. Bit errors that occur within the delimiter may confuse the receiving device, resulting in a truncated or corrupt Ethernet frame. Hence, what is needed is a method and an apparatus for delineating data in an FEC-coded Ethernet frame which is robust against bit errors within the delimiter.

SUMMARY

One embodiment of the present invention provides a system that facilitates construction of a forward error correction (FEC) coded Ethernet frame. During operation, the system receives a conventional Ethernet frame. The system then generates a number of FEC parity bits for the conventional Ethernet frame and inserts a start sequence before the conventional Ethernet frame. Next, the system appends an even- or odd-delimiter to the conventional Ethernet frame. The even-delimiter is used to separate the conventional Ethernet frame from the FEC parity bits if the last symbol of the conventional Ethernet frame is in an odd-numbered position. The odd-delimiter is used to separate the conventional Ethernet frame from the FEC parity bits if the last symbol of the conventional Ethernet frame is in an even-numbered position. The even-delimiter and the odd-delimiter are selected such that there is a sufficiently large Hamming distance between them, thereby reducing the probability of mistaking the even-delimiter for the odd-delimiter, or mistaking the odd-delimiter for the even-delimiter, if bit error occurs within the even- or odd-delimiter. The system also appends the number of FEC parity bits to the even- or odd-delimiter and appends a second delimiter to the FEC parity bits.

In a variation of this embodiment, the even-delimiter starts with code groups /T/R/ according to the IEEE 802.3 Ethernet standard, and includes a first number of code groups after the /T/R/ code groups; and the odd-delimiter starts with code groups /T/R/R/ according to the IEEE 802.3

Ethernet standard, and includes a second number of code groups after the /T/R/R/ code groups; wherein the Hamming distance between the even-delimiter and the odd-delimiter is larger than a maximum number of allowed bit errors that may occur within the even-delimiter or the odd-delimiter.

In a further variation, if the running disparity at the end of the conventional Ethernet frame is negative, the first number of code groups after the /T/R/ code groups in the even-delimiter includes sequence /K28.5/D29.5/ according to the IEEE 802.3 standard, and the second number of code groups after the /T/R/R/ code groups in the odd-delimiter includes sequence /K28.5/D16.2/ according to the IEEE 802.3 standard.

In a further variation, if the running disparity at the end of the conventional Ethernet frame is positive, the first number of code groups after the /T/R/ code groups in the even-delimiter includes sequence /K28.5/D10.1/ according to the IEEE 802.3 standard, and the second number of code groups after the /T/R/R/ code groups in the odd-delimiter includes sequence /K28.5/D16.2/ according to the IEEE 802.3 standard.

Another embodiment of the present invention provides a system that facilitates data delineation in a forward error correction (FEC) coded Ethernet frame. During operation, the system receives an FEC-coded Ethernet frame. The system then scans the bit stream of the received FEC-coded Ethernet frame; and identifies a delimiter between a conventional Ethernet frame and FEC parity bits in the FEC-coded Ethernet frame by matching a number of consecutive bits in the bit stream to an even- or odd-delimiter. The even-delimiter and the odd-delimiter are selected such that there is a sufficiently large Hamming distance between them, thereby reducing the probability of mistaking the even-delimiter for the odd-delimiter, or mistaking the odd-delimiter for the even-delimiter, if bit error occurs within the even- or odd-delimiter.

In a variation of this embodiment, the even-delimiter starts with code groups /T/R/ according to the IEEE 802.3 Ethernet standard, and includes a first number of code groups after the /T/R code groups. The odd-delimiter starts with code groups /T/R/R according to the IEEE 802.3 Ethernet standard, and includes a second number of code groups after the /T/R/R/ code groups. The Hamming distance between the even-delimiter and the odd-delimiter is larger than a maximum number of allowed bit errors that may occur within the even-delimiter or the odd-delimiter.

In a further variation, if the running disparity at the end of the conventional Ethernet frame is negative, the first number of code groups after the /T/R/ code groups in the even-delimiter includes sequence /K28.5/D29.5/ according to the IEEE 802.3 standard, and the second number of code groups after the /T/R/R/ code groups in the odd-delimiter includes sequence /K28.5/D16.2/ according to the IEEE 802.3 standard.

In a further variation, if the running disparity at the end of the conventional Ethernet frame is positive, the first number of code groups after the /T/R/ code groups in the even-delimiter includes sequence /K28.5/D10.1/ according to the IEEE 802.3 standard, and the second number of code groups after the /T/R/R/ code groups in the odd-delimiter includes sequence /K28.5/D16.2/ according to the IEEE 802.3 standard.

Another embodiment of the present invention provides a system that facilitates data delineation in an FEC-coded Ethernet frames. During operation, the system receives the FEC-coded Ethernet frame, which includes a start sequence, a conventional Ethernet frame, an even- or odd-delimiter, a number of FEC parity bits, and a second delimiter. The even-delimiter is used to separate the conventional Ethernet frame from the FEC parity bits if the last byte of the conventional Ethernet frame is in an odd-numbered position, and the odd-delimiter is used to separate the conventional Ethernet frame if the last byte of the conventional Ethernet frame is in an even-numbered position. The system produces a first version of the conventional Ethernet frame from the received FEC-coded Ethernet frame based on an assumption that an even-delimiter separates the conventional Ethernet frame from the FEC parity bits. The system also produces a second version of the conventional Ethernet frame from the received FEC-coded Ethernet frame based on an assumption that an odd-delimiter separates the conventional Ethernet frame from the FEC parity bits. The system then selects between the two versions the one that more faithfully reproduces the original conventional Ethernet frame contained in the received FEC-coded Ethernet frame.

In a variation of this embodiment, selecting between the two versions the one that more faithfully reproduces the original conventional Ethernet frame involves: checking the first version of the conventional Ethernet frame against the FEC parity bits; checking the second version of the conventional Ethernet frame against the FEC parity bits; and choosing the version that produces the least number of errors when checked against the FEC parity bits.

Another embodiment of the present invention provides a system that facilitates construction of an FEC-coded Ethernet frame, wherein the FEC-coded Ethernet frame includes a start sequence, a conventional Ethernet frame, a first delimiter, a number of FEC parity bits, and a second delimiter; and wherein the first delimiter is used to separate the conventional Ethernet frame from the FEC parity bits. During operation, the system calculates the FEC parity bits based on the conventional Ethernet frame and the first delimiter, whereby the FEC parity bits may be used to correct bit errors that occur within the conventional Ethernet frame and the first delimiter.

In a variation of this embodiment, calculating the FEC parity bits involves: dividing the conventional Ethernet frame and the first delimiter into fixed-length blocks of bits, wherein the last block may use padding to meet the fixed length; for each block, computing a fixed number of FEC parity bits; and placing all the FEC parity bits for all the blocks after the conventional Ethernet frame and the first delimiter.

Another embodiment of the present invention provides a system that facilitates data delineation in an FEC-coded Ethernet frame, wherein the FEC-coded Ethernet frame includes a start sequence, a conventional Ethernet frame, a first delimiter, a number of FEC parity bits, and a second delimiter; wherein the first delimiter is used to separate the conventional Ethernet frame from the FEC parity bits; and wherein the FEC parity bits are calculated for the conventional Ethernet frame and the first delimiter. During operation, the system determines the length of the entire FEC-coded Ethernet frame. The system also determines the number of the FEC parity bits based on the length of the entire FEC-coded Ethernet frame. The system then delineates the FEC parity bits from the conventional Ethernet frame and the first delimiter based on the number of the FEC parity bits.

In a variation of this embodiment, the system checks the conventional Ethernet frame and the first delimiter against the FEC parity bits to correct any possible bit errors.

In another variation of this embodiment, the FEC parity bits are comprised of groups of FEC parity bits, each of which is of the same length and corresponds to a fixed-length block of bits from the conventional Ethernet frame and the first delimiter, wherein the last block may use padding to meet the fixed length. Determining the number of the FEC parity bits is based on the following calculation:

$$Z = \left\lceil \frac{X}{(m+n)} \right\rceil \cdot n$$

where
- Z is the number of the FEC parity bits;
- X is the length of the entire FEC-coded Ethernet frame;
- m is the number of a block of bits from the conventional Ethernet frame and the first delimiter; based on which a group of FEC parity bits are calculated; and
- n is the number of a group of FEC parity bits corresponding to a block of bits from the conventional Ethernet frame and the first delimiter.

BRIEF DESCRIPTION OF THE FIGURES

FIG. 1 illustrates the format of an FEC-coded Ethernet frame.

FIG. 2 illustrates the code-group sequence of delimiters TFEC_E and TFEC_O according to the current IEEE 802.3ah standard.

DETAILED DESCRIPTION

Figure 3:
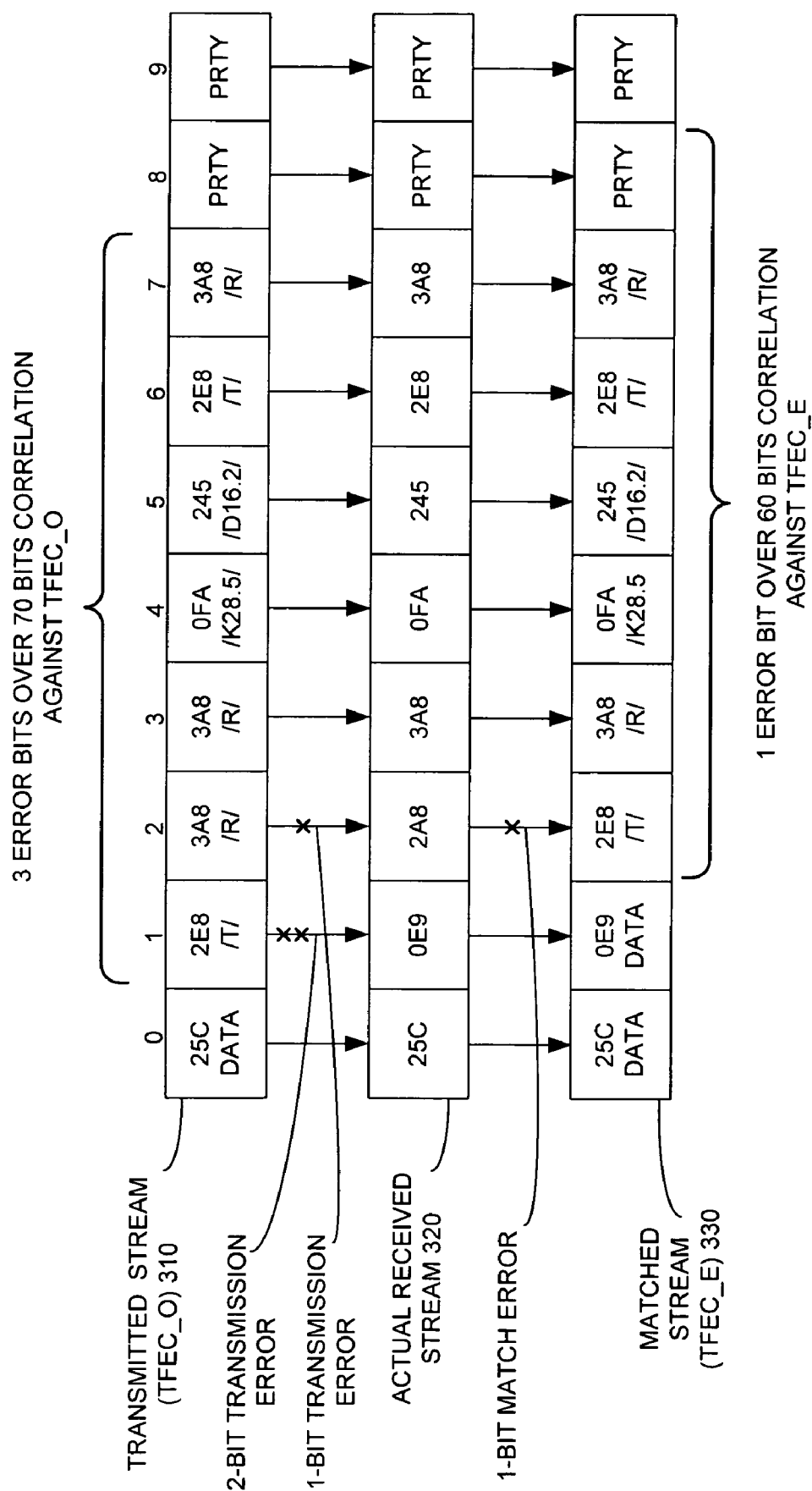
FIG. 3 illustrates a potential error in data-delineation that may occur in an FEC-coded Ethernet frame implemented according to the current IEEE 802.3ah standard.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

FEC-coded Ethernet Frame Format

FIG. 1 illustrates the format of an FEC-coded Ethernet frame. Note that in general data on a gigabit Ethernet link is encoded with an 8-bit/10-bit (8B/10B) encoding scheme. A byte of data is mapped to two 10-bit sequences (called "code groups"). The reason for having two 10-bit code groups is to maintain a balanced running disparity. Typically, one of the two code groups has six "1"s and four "0"s, which is used when the running disparity is negative. The other of the two code groups has four "1"s and six "0"s, which is used when the running disparity is positive. Alternatively, for some data bytes, both of the corresponding 10-bit code groups have equal number of "1"s and "0"s to preserve the running disparity.

For example, an octet of hexadecimal value 50 (01010000 in binary format) is mapped to code group 0110110101 (to be used with a negative current running disparity) and code group 1001000101 (to be used with a positive current running disparity). This pair of code groups are identified as "D16.2". "D" indicates that this pair of code groups are used for data. "16" is the decimal value of the lower five bits of the octet ("10000"), and "2" is the decimal value of the higher three bits of the octet ("010"). For convenience, a 10-bit code group can be expressed as a three-digit hex number, wherein the three digits represent the values of the highest two bits, the middle four bits, and the lowest four bits. Thus, 1001000101 is expressed as "245".

Besides data code groups, there are also special code groups used for control purposes. For example, "K28.5" corresponds to code groups 0011111010 (for negative running disparity) and 1100000101 (for positive running disparity). Note that "K" indicates that it is a special code group, and "28.5" indicates the corresponding octet value BC (or 10111100 in binary format). The IEEE Standard 802.3-2002 "Local and Metropolitan Area Networks" (hereinafter "IEEE 802.3 standard") contains a complete list of 8B/10B code groups.

The IEEE 802.3 standard also defines special control sequences (called "ordered sets"). For example, ordered set /I1/(/K28.5/D5.6/) is the IDLE ordered set. It is defined such that the running disparity at the end of the transmitted /I1/ is opposite to that of the beginning running disparity. The IDLE ordered set /I2/(/K28.5/D16.2) is defined such that the running disparity at the end of the transmitted /I2/ is the same as the beginning running disparity. The first IDLE ordered set following a packet or a control sequence restores the current positive or negative running disparity to a negative value. All subsequent IDLEs are /I2/ to ensure a negative running disparity. Other ordered sets include /R/ (Carrier Extend, /K23.7/), /S/ (Start of Packet, /K27.8/), and /T/ (End of Packet, /K29.7).

As shown in FIG. 1, an FEC-coded Ethernet frame starts with a start code sequence 110 (called "SFEC"). SFEC is defined as /K28.5/D6.4/K28.5/S/, according to the IEEE 802.3ah standard. Note that the last ordered set in the SFEC sequence is the /S/ ordered set. This allows a non-FEC-enabled receiving device to recognize the start of a conventional Ethernet frame which follows the SFEC sequence. Following SFEC is a conventional Ethernet frame, which includes a preamble/start-of-frame delimiter (SFD) field 120, a data frame 130, and a frame-check-sequence (FCS) field 170. FCS field 170 typically contains a cyclic redundancy check (CRC) sequence.

Following FCS field 140 is a first delimiter TFEC 150 indicating the end of the conventional Ethernet frame. Another purpose of TFEC 150 is to delineate the conventional Ethernet frame from the following FEC parity bits. According to the IEEE 802.3 standard (for non-FEC-coded Ethernet), an end-of-packet delimiter should be either /T/R/ or /T/R/R/. The reason for having two delimiters is to ensure that the code group that follows the delimiter falls in an even-numbered position. Note that according to the IEEE 802.3-2002 standard clause 36.2.4.2, the first code-group of every multi-code-group ordered-set is always transmitted in an even-numbered position counting from the first code-group after a reset or power-on. Subsequent code-groups continuously alternate as odd and even-numbered code-groups. Therefore, /T/R/ is used when /T/ is in an even-numbered position, and /T/R/R/ is used when /T/ is in an odd-numbered position. Accordingly, as proposed in the IEEE 802.3ah standard, TFEC 150 has two sequences: TFEC_E (/T/R/I/T/R) to be used when the first /T/ is in an odd-numbered position, and TFEC_O(/T/R/R/I/T/R) to be used when the first /T/ is in an even-numbered position. Note that TFEC_E and TFEC_O include the conventional end-of-packet delimiter (/T/R/ and /T/R/R/, respectively). Therefore, a non-FEC-enabled receiving device can recognize the end of a conventional Ethernet packet.

Following TFEC field 150 are the FEC parity bits 160. Note that, according to the current 802.3ah standard, FEC parity bits 160 are based on RS(255, 239) codes derived from the conventional Ethernet frame and do not protect TFEC field 150 against bit errors. After the FEC parity bits is another TFEC field 170 which terminates the entire FEC-coded frame. Since the beginning of the parity bits is always in an even-numbered position because of TFEC 150, and because the total number of parity bits is always even, TFEC 170 uses only the TFEC_E sequence.

Problem in the Existing Standard

FIG. 2 illustrates the code-group sequence of delimiters TFEC_E and TFEC_O according to the current IEEE 802.3ah standard. Frame 210 uses TFEC_E as its delimiter between the conventional Ethernet frame and the FEC parity bits, because the first code group of the delimiter is in an even-numbered position. Frame 220 uses TFEC_O as its delimiter between the conventional Ethernet frame and the FEC parity bits, because the first code group of the delimiter is in an odd-numbered position.

In order to detect the delimiter, a receiving device scans the input stream of symbols for a match with TFEC_E or TFEC_O. Because the delimiter is not protected by FEC, a number of bit errors may be tolerated. According to the current IEEE 802.3ah standard, up to five bit errors are tolerated in the process of matching TFEC delimiters. However, as shown in FIG. 2, the Hamming distance over the 60 bits of correlation between TFEC_E and TFEC_O is only 2 bits, namely the difference at position 2 between 2E8 (/T/) and 3A8 (/R/). This means that if the last data code group (in position 1) of frame 210 is in error and happens to be the same as a /T/, the receiving device could mistake the TFEC_E in frame 210 for a TFEC_O. Hence, the last code group (part of the CRC sequence) of the conventional Ethernet frame is lost. The entire conventional Ethernet frame will be lost because of a mismatch between its CRC sequence and data.

In addition, a mis-match may occur even when there is no bit error in the TFEC delimiter. Suppose a receiving device is receiving frame 210. If the data code group at position 1 is within three bits of Hamming distance from /T/, the receiving device will accept it as a /T/, instead of a regular data code group. As to the code group at position 2, the receiving device will interpret it as a /R/, although it actually is a /T/. (Note that the Hamming distance between /T/ and /R/ is only two bits.) This interpretation is acceptable according to the current IEEE 802.3ah standard, because in total the receiving device can tolerate five bit errors. As a result, the receiving device can mistake a correctly transmitted TFEC_E sequence in frame 210 as an erroneously transmitted TFEC_O sequence.

FIG. 3 illustrates a potential error in data-delineation that may occur in an FEC-coded Ethernet frame implemented according to the current IEEE 802.3ah standard. The actual transmitted (correct) stream 310 contains a TFEC_O. Suppose that three bit errors occur during transmission, resulting in an actual received stream 320. Two errors are within the code group in position 1, and one error is within the code group in position 2. When the receiving device scans received stream 320, it is more likely to match stream 320 to stream 330 which contains a TFEC_E, than to match stream 320 to stream 310. This is because there is only one error bit over 60 bits correlation between stream 320 and 330, while there are three error bits over 70 bits correlation between stream 320 and 310. The result is a corrupt Ethernet frame, because now the code group in position 1 is considered as part of the CRC sequence for the Ethernet frame.

Increasing Hamming Distance Between TFEC-E and TFEC-O

Figure 4A:
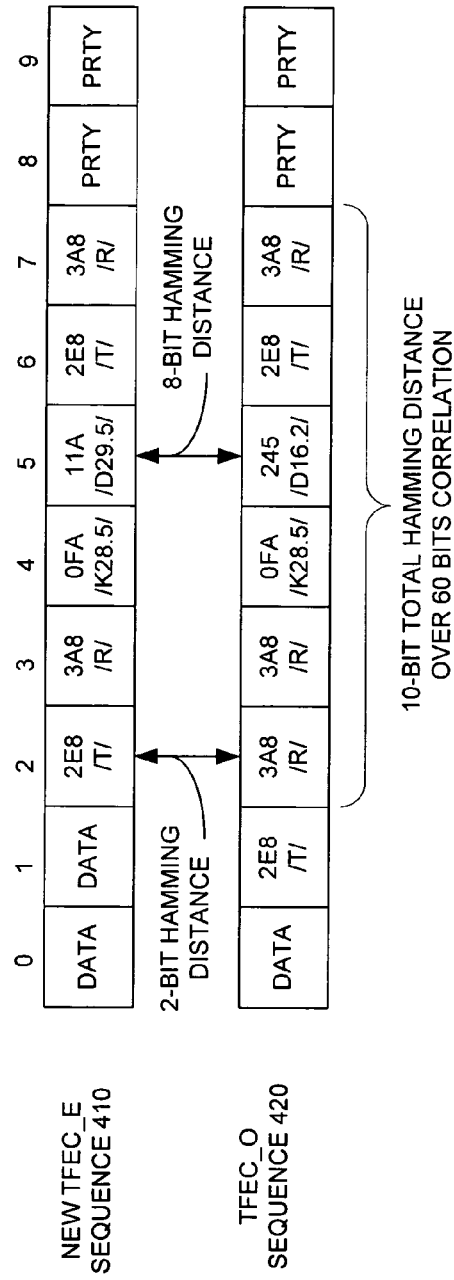
FIG. 4A illustrates an improved code-group sequence of delimiters TFEC_E and TFEC_O when the starting running disparity is negative in accordance with an embodiment of the present invention.

One way to solve the above-described problem is to increase the Hamming distance between TFEC_E and TFEC_O, such that the Hamming distance is larger than the maximum number of tolerated error bits. FIG. 4A illustrates an improved code-group sequence of delimiters TFEC_E and TFEC_O when the starting running disparity is negative in accordance with an embodiment of the present invention. TFEC_E sequence 410 is re-defined as /T/R/K28.5/D29.5/T/R/, whereas TFEC_O sequence 420 remains as defined in the IEEE 802.3ah standard. This new definition of TFEC_E results in a 10-bit total Hamming distance over 60 bits correlation between TFEC_E and TFEC_O (2 bits between /T/ and /R/ in position 2, and 8 bits between /D29.5/and /D16.2/in position 5).

Figure 4B:
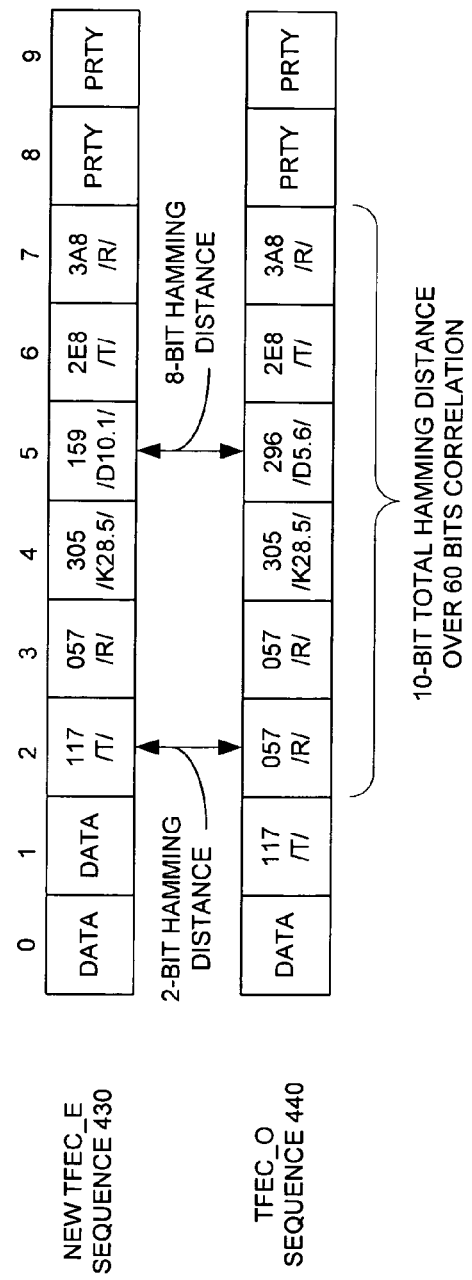
FIG. 4B illustrates an improved code-group sequence of delimiters TFEC_E and TFEC_O when the starting running disparity is positive in accordance with an embodiment of the present invention.

FIG. 4B illustrates an improved code-group sequence of delimiters TFEC_E and TFEC_O when the starting running disparity is positive in accordance with an embodiment of the present invention. TFEC_E sequence 430 is re-defined as /T/R/K28.5/D10.1/T/R/, whereas TFEC_O sequence 440 remains as defined in the IEEE 802.3ah standard. This new definition of TFEC_E results in a 10-bit total Hamming distance over 60 bits correlation between TFEC_E and TFEC_O (2 bits between /T/ and /R/ in position 2, and 8 bits between /D10.1/and /D5.6/in position 5).

It should be noted that FIG. 4A and FIG. 4B only illustrate one example of how to increase the Hamming distance between TFEC_E and TFEC_O. Other code groups and sequences can also be used to achieve the same goal.

Using Two Parallel FEC Decoding Processes

Instead of changing the TFEC_E or TFEC_O sequences, another way to solve the data delineation problem is to use two FEC decoding processes, one based on the assumption that the received frame contains a TFEC_E, and the other based on the assumption that the received frame contains a TFEC_O.

Figure 5:
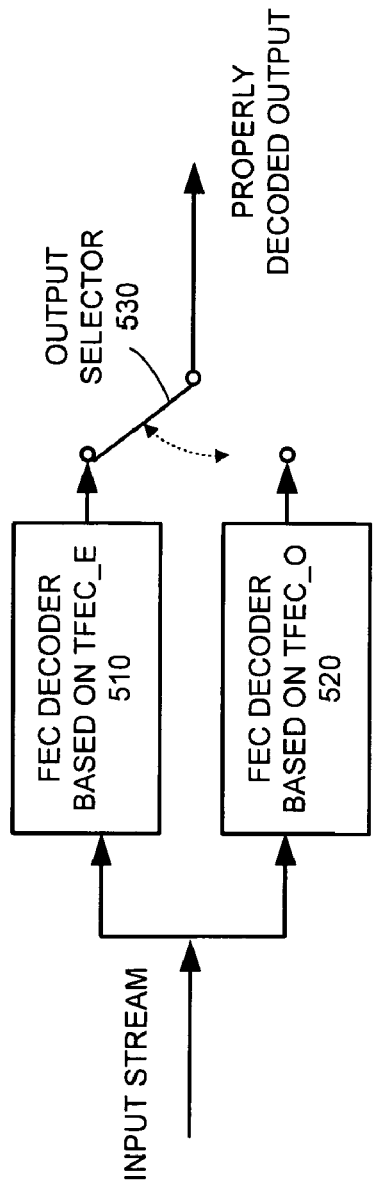
FIG. 5 illustrates how two parallel FEC decoding processes can be used to obtain correct data delineation in an FEC-coded Ethernet frame in accordance with an embodiment of the present invention.

FIG. 5 illustrates how two parallel FEC decoding processes can be used to obtain correct data delineation in an FEC-coded Ethernet frame in accordance with an embodiment of the present invention. As shown in FIG. 5, two FEC decoders process the input stream in parallel. FEC decoder 510 decodes the input stream based on the assumption that the delimiter between the conventional Ethernet frame and the FEC parity bits is TFEC_E. FEC decoder 520 decodes the input stream based on the assumption that the delimiter between the convention Ethernet frame and the FEC parity bits is TFEC_O. Output selector 530 chooses the properly decoded output that produces a non-corrupt Ethernet frame.

Including the Delimiter in FEC Code

A third approach to solve the data delineation problem described above is to calculate the FEC parity bits over the conventional Ethernet frame and the first TFEC delimiter, such that bit errors that occur within the delimiter can also be corrected. However, the receiving device still needs to delineate the FEC parity bits from the rest of the frame in order to correct any bit errors.

Figure 6:
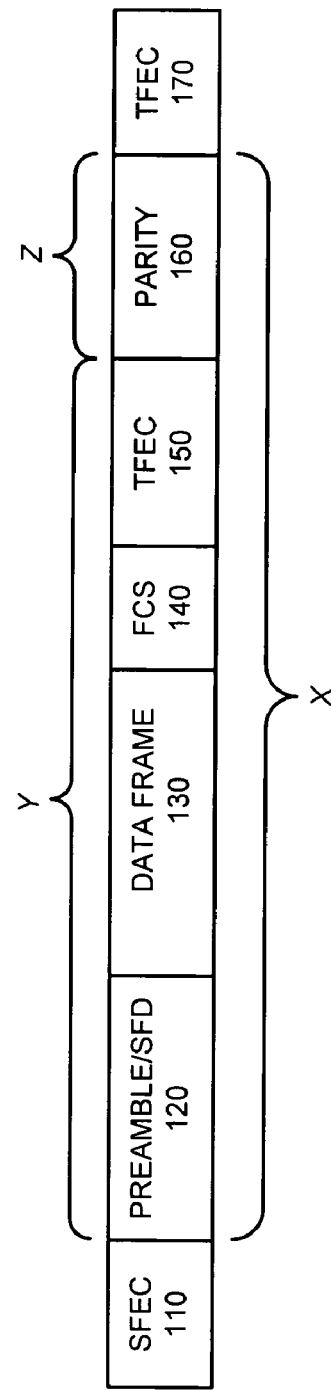
FIG. 6 illustrates how to calculate the number of FEC parity bits when the delimiter is part of the FEC code in accordance with an embodiment of the present invention.

FIG. 6 illustrates how to calculate the number of FEC parity bits when the delimiter is part of the FEC code in accordance with an embodiment of the present invention. When the receiving device scans the input stream, it is possible to learn the total length, X, of the conventional Ethernet frame, the first TFEC delimiter, and the FEC parity bits, because SFEC 110 and the second TFEC delimiter 170 can be easily recognized. The total length of the conventional Ethernet frame and TFEC 150 is denoted as Y, and the number of FEC parity bits 160 is denoted as Z. Because the FEC scheme uses RS(255, 239) code, for every 239-byte block from the data symbol section (bits within Y), there is a 16-byte parity group in the parity section (bits within Z). Therefore, the number of the parity bits can be calculated as:

$$Z = \left\lceil \frac{X}{(m+n)} \right\rceil \cdot n \quad (1)$$

where
⌈ ⌉ is the ceiling function;
m is the number of a block of bits from the conventional Ethernet frame and the first delimiter, which is 239; and
n is the number of a group of FEC parity bits corresponding to a block of bits from the conventional Ethernet frame and the first delimiter, which is 16. Note that a ceiling function is used because Z may not contain an integer number of 239 bytes, and because a block with less than 239 data bytes is padded up to have 239 bytes for the FEC calculation.

Figure 7:
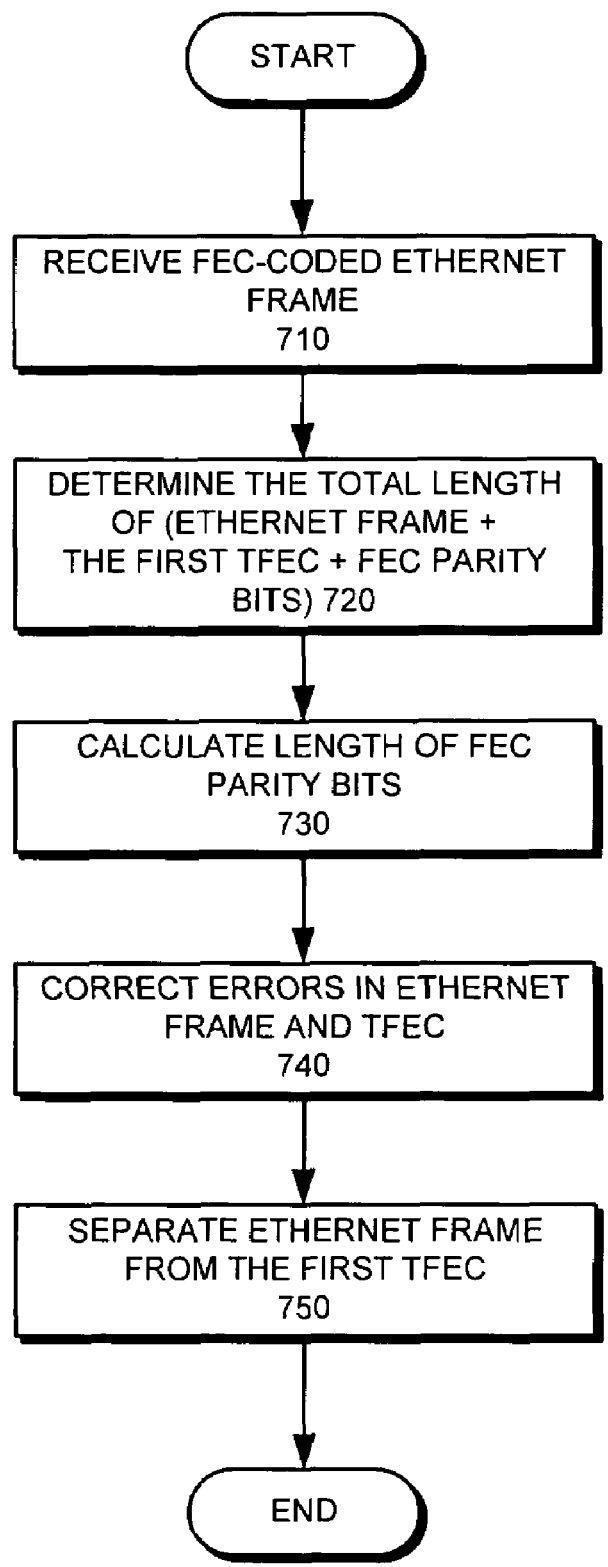
FIG. 7 presents a flow chart illustrating the process of calculating the number of FEC parity bits and subsequent data delineation in accordance with an embodiment of the present invention.

FIG. 7 presents a flow chart illustrating the process of calculating the number of FEC parity bits and subsequent data delineation in accordance with an embodiment of the present invention. The system within a receiving device starts by receiving an FEC-encoded Ethernet frame (i.e., the data stream after an SFEC up to the second TFEC) (step 710). Next, the system determines the total length of the conventional Ethernet frame, and first TFEC delimiter, and the FEC parity bits (step 720). The system then calculates the number of FEC parity bits based on equation (1) (step 730). Based on the delineated FEC parity bits, the system corrects any possible bit errors that occur within the conventional Ethernet frame and the first TFEC delimiter (step 40). The system then separates the conventional Ethernet frame from the first TFEC delimiter (step 750).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for constructing a forward error correction (FEC) coded Ethernet frame, comprising:
    receiving a conventional Ethernet frame;
    generating a number of FEC parity bits for the conventional Ethernet frame;
    inserting a start sequence before the conventional Ethernet frame;
    appending an even- or odd-delimiter to the conventional Ethernet frame, wherein
        the even-delimiter is used to separate the conventional Ethernet frame from the FEC parity bits if the last symbol of the conventional Ethernet frame is in an odd-numbered position;
        wherein the odd-delimiter is used to separate the conventional Ethernet frame from the FEC parity bits if the last symbol of the conventional Ethernet frame is in an even-numbered position; and
        wherein the even-delimiter and the odd-delimiter are selected such that a Hamming distance between them is greater than the number of bit errors tolerated for the even-delimiter or the odd-delimiter, thereby reducing the probability of mistaking the even-delimiter for the odd-delimiter, or mistaking the odd-delimiter for the even-delimiter, if bit error occurs within the even- or odd-delimiter;
    appending the number of FEC parity bits to the even- or odd-delimiter; and
    appending a second delimiter to the FEC parity bits.

2. The method of claim 1, wherein the even-delimiter starts with code groups /T/R/ according to the IEEE 802.3 Ethernet standard, and includes a first number of code groups after the /T/R/ code groups;
    wherein the odd-delimiter starts with code groups /T/R/R/ according to the IEEE 802.3 Ethernet standard, and includes a second number of code groups after the /T/R/R/ code groups; and
    wherein the Hamming distance between the even-delimiter and the odd-delimiter is larger than a maximum number of allowed bit errors that may occur within the even-delimiter or the odd-delimiter.

3. The method of claim 2, wherein if the running disparity at the end of the conventional Ethernet frame is negative,
    the first number of code groups after the /T/R/ code groups in the even-delimiter includes sequence /K28.5/ D29.5/ according to the IEEE 802.3 standard, and
    the second number of code groups after the /T/R/R/ code groups in the odd-delimiter includes sequence /K28.5/ D16.2/ according to the IEEE 802.3 standard.

4. The method of claim 2, wherein if the running disparity at the end of the conventional Ethernet frame is positive, the first number of code groups after the /T/R/ code
groups in the even-delimiter includes sequence /K28.5/
D10.1/ according to the IEEE 802.3 standard, and the second number of code groups after the /T/R/R/ code
groups in the odd-delimiter includes sequence /K28.5/
D16.2/ according to the IEEE 802.3 standard.

5. An apparatus for constructing a forward error correction (FEC) coded Ethernet frame, comprising:
a receiving mechanism configured to receive a conventional Ethernet frame;
an FEC encoder configured to generate a number of FEC parity bits for the conventional Ethernet frame; and
an FEC-coded Ethernet frame construction mechanism configured to:
insert a start sequence before the conventional Ethernet frame;
append an even- or odd-delimiter to the conventional Ethernet frame, wherein
the even-delimiter is used to separate the conventional Ethernet frame from the FEC parity bits if the last symbol of the conventional Ethernet frame is in an odd-numbered position;
wherein the odd-delimiter is used to separate the conventional Ethernet frame from the FEC parity bits if the last symbol of the conventional Ethernet frame is in an even-numbered position; and
wherein the even-delimiter and the odd-delimiter are selected such that a Hamming distance between them is greater than the number of bit errors tolerated for the even-delimiter or the odd-delimiter, thereby reducing the probability of mistaking the even-delimiter for the odd-delimiter, or mistaking the odd-delimiter for the even-delimiter, if bit error occurs within the even- or odd-delimiter;
append the number of FEC parity bits to the even- or odd-delimiter; and
append a second delimiter to the FEC parity bits.

6. The apparatus of claim 5, wherein the even-delimiter starts with code groups /T/R/ according to the IEEE 802.3 Ethernet standard, and includes a first number of code groups after the /T/R/ code groups;
wherein the odd-delimiter starts with code groups /T/R/R/ according to the IEEE 802.3 Ethernet standard, and includes a second number of code groups after the /T/R/R/ code groups; and
wherein the Hamming distance between the even-delimiter and the odd-delimiter is larger than a maximum number of allowed bit errors that may occur within the even-delimiter or the odd-delimiter.

7. The apparatus of claim 6, wherein if the running disparity at the end of the conventional Ethernet frame is negative,
the first number of code groups after the /T/R/ code groups in the even-delimiter includes sequence /K28.5/ D29.5/ according to the IEEE 802.3 standard, and
the second number of code groups after the /T/R/R/ code groups in the odd-delimiter includes sequence /K28.5/ D16.2/ according to the IEEE 802.3 standard.

8. The apparatus of claim 6, wherein if the running disparity at the end of the conventional Ethernet frame is positive,
the first number of code groups after the /T/R/ code groups in the even-delimiter includes sequence /K28.5/ D10.1/ according to the IEEE 802.3 standard, and
the second number of code groups after the /T/R/R/ code groups in the odd-delimiter includes sequence /K28.5/ D16.2/ according to the IEEE 802.3 standard.

9. A method for delineating data in a forward error correction (FEC) coded Ethernet frame, comprising:
receiving an FEC-coded Ethernet frame;
scanning the bit stream of the received FEC-coded Ethernet frame; and
identifying a delimiter between a conventional Ethernet frame and FEC parity bits in the FEC-coded Ethernet frame by matching a number of consecutive bits in the bit stream to an even- or odd-delimiter which is a predetermined bit sequence;
wherein the even-delimiter and the odd-delimiter are selected such that a Hamming distance between them is greater than the number of bit errors tolerated for the even-delimiter or the odd-delimiter, thereby reducing the probability of mistaking the even-delimiter for the odd-delimiter, or mistaking the odd-delimiter for the even-delimiter, if bit error occurs within the even- or odd-delimiter.

10. The method of claim 9,
wherein the even-delimiter starts with code groups /T/R/ according to the IEEE 802.3 Ethernet standard, and includes a first number of code groups after the /T/R/ code groups;
wherein the odd-delimiter starts with code groups /T/R/R/ according to the IEEE 802.3 Ethernet standard, and includes a second number of code groups after the /T/R/R/ code groups; and
wherein the Hamming distance between the even-delimiter and the odd-delimiter is larger than a maximum number of allowed bit errors that may occur within the even-delimiter or the odd-delimiter.

11. The method of claim 10, wherein if the running disparity at the end of the conventional Ethernet frame is negative,
the first number of code groups after the /T/R/ code groups in the even-delimiter includes sequence /K28.5/ D29.5/ according to the IEEE 802.3 standard, and
the second number of code groups after the /T/R/R/ code groups in the odd-delimiter includes sequence /K28.5/ D16.2/ according to the IEEE 802.3 standard.

12. The method of claim 10, wherein if the running disparity at the end of the conventional Ethernet frame is positive,
the first number of code groups after the /T/R/ code groups in the even-delimiter includes sequence /K28.5/ D10.1/ according to the IEEE 802.3 standard, and
the second number of code groups after the /T/R/R/ code groups in the odd-delimiter includes sequence /K28.5/ D16.2/ according to the IEEE 802.3 standard.

13. An apparatus for delineating data in a forward error correction (FEC) coded Ethernet frame, comprising:
a receiving mechanism configured to receive an FEC-coded Ethernet frame;
a scanning mechanism configured to scan the bit stream of the received FEC-coded Ethernet frame; and
a matching mechanism configured to match a number of consecutive bits in the bit stream to an even- or odd-delimiter which is a predetermined bit sequence;
wherein the even-delimiter and the odd-delimiter are selected such that a Hamming distance between them is greater than the number of bit errors tolerated for the even-delimiter or the odd-delimiter, thereby reducing the probability of mistaking the even-delimiter for the odd-delimiter, or mistaking the odd-delimiter for the even-delimiter, if bit error occurs within the even- or odd-delimiter.

14. The apparatus of claim 13,
wherein the even-delimiter starts with code groups /T/R/ according to the IEEE 802.3 Ethernet standard, and includes a first number of code groups after the /T/R/ code groups;
wherein the odd-delimiter starts with code groups /T/R/R/ according to the IEEE 802.3 Ethernet standard, and includes a second number of code groups after the /T/R/R/ code groups; and
wherein the Hamming distance between the even-delimiter and the odd-delimiter is larger than a maximum number of allowed bit errors that may occur within the even-delimiter or the odd-delimiter.

15. The apparatus of claim 14, wherein if the running disparity at the end of the conventional Ethernet frame is negative,
the first number of code groups after the /T/R/ code groups in the even-delimiter includes sequence /K28.5/ D29.5/ according to the IEEE 802.3 standard, and
the second number of code groups after the /T/R/R/ code groups in the odd-delimiter includes sequence /K28.5/ D16.2/ according to the IEEE 802.3 standard.

16. The apparatus of claim 14, wherein if the running disparity at the end of the conventional Ethernet frame is positive,
the first number of code groups after the /T/R/ code groups in the even-delimiter includes sequence /K28.5/ D10.1/ according to the IEEE 802.3 standard, and
the second number of code groups after the /T/R/R/ code groups in the odd-delimiter includes sequence /K28.5/ D16.2/ according to the IEEE 802.3 standard.

17. A method for delineating data in an FEC-coded Ethernet frames, comprising:
receiving the FEC-coded Ethernet frame, which includes a start sequence, a conventional Ethernet frame, an even- or odd-delimiter, a number of FEC parity bits, and a second delimiter;
wherein the even-delimiter is used to separate the conventional Ethernet frame from the FEC parity bits if the last byte of the conventional Ethernet frame is in an odd-numbered position; and
wherein the odd-delimiter is used to separate the conventional Ethernet frame if the last byte of the conventional Ethernet frame is in an even-numbered position;
producing a first version of the conventional Ethernet frame from the received FEC-coded Ethernet frame based on an assumption that an even-delimiter separates the conventional Ethernet frame from the FEC parity bits;
producing a second version of the conventional Ethernet frame from the received FEC-coded Ethernet frame based on an assumption that an odd-delimiter separates the conventional Ethernet frame from the FEC parity bits; and
selecting between the two versions the one that more faithfully reproduces the original conventional Ethernet frame contained in the received FEC-coded Ethernet frame.

18. The method of claim 17, wherein selecting between the two versions the one that more faithfully reproduces the original conventional Ethernet frame involves:
checking the first version of the conventional Ethernet frame against the FEC parity bits;
checking the second version of the conventional Ethernet frame against the FEC parity bits; and
choosing the version that produces the least number of errors when checked against the FEC parity bits.

19. An apparatus for delineating data in an FEC-coded Ethernet frames, comprising:
a receiving mechanism configured to receive the FEC-coded Ethernet frame, which includes a start sequence, a conventional Ethernet frame, an even- or odd-delimiter, a number of FEC parity bits, and a second delimiter;
wherein the even-delimiter is used to separate the conventional Ethernet frame from the FEC parity bits if the last byte of the conventional Ethernet frame is in an odd-numbered position; and
wherein the odd-delimiter is used to separate the conventional Ethernet frame if the last byte of the conventional Ethernet frame is in an even-numbered position;
a first FEC decoder configured to produce a first version of the conventional Ethernet frame from the received FEC-coded Ethernet frame based on an assumption that an even-delimiter separates the conventional Ethernet frame from the FEC parity bits;
a second FEC decoder configured to produce a second version of the conventional Ethernet frame from the received FEC-coded Ethernet frame based on an assumption that an odd-delimiter separates the conventional Ethernet frame from the FEC parity bits; and
a selecting mechanism configured to select between the two versions the one that more faithfully reproduces the original conventional Ethernet frame contained in the received FEC-coded Ethernet frame.

20. The apparatus of claim 19, wherein to select between the two versions the one that more faithfully reproduces the original conventional Ethernet frame, the selecting mechanism is configured to:
check the first version of the conventional Ethernet frame against the FEC parity bits;
check the second version of the conventional Ethernet frame against the FEC parity bits; and
choose the version that produces the least number of errors when checked against the FEC parity bits.

21. A method for constructing an FEC-coded Ethernet frame, wherein the FEC-coded Ethernet frame includes a start sequence, a conventional Ethernet frame, a first delimiter, a number of FEC parity bits, and a second delimiter; and
wherein the first delimiter is used to separate the conventional Ethernet frame from the FEC parity bits;
the method comprising calculating the FEC parity bits based on the conventional Ethernet frame and the first delimiter, whereby the FEC parity bits may be used to correct bit errors that occur within the conventional Ethernet frame and the first delimiter.

22. The method of claim 21, wherein calculating the FEC parity bits involves:
dividing the conventional Ethernet frame and the first delimiter into fixed-length blocks of bits, wherein the last block may use padding to meet the fixed length;
for each block, computing a fixed number of FEC parity bits; and
placing all the FEC parity bits for all the blocks after the conventional Ethernet frame and the first delimiter.

23. An apparatus for constructing an FEC-coded Ethernet frame, wherein the FEC-coded Ethernet frame includes a start sequence, a conventional Ethernet frame, a first delimiter, a number of FEC parity bits, and a second delimiter; and
wherein the first delimiter is used to separate the conventional Ethernet frame from the FEC parity bits;

the apparatus comprising an FEC encoder configured to calculate the FEC parity bits based on the conventional Ethernet frame and the first delimiter, whereby the FEC parity bits may be used to correct bit errors that occur within the conventional Ethernet frame and the first delimiter.

24. The apparatus of claim 23, wherein to calculate the FEC parity bits, the FEC encoder is configured to:
divide the conventional Ethernet frame and the first delimiter into fixed-length blocks of bits, wherein the last block may use padding to meet the fixed length;
for each block, compute a fixed number of FEC parity bits; and
to place all the FEC parity bits for all the blocks after the conventional Ethernet frame and the first delimiter.

25. A method for delineating data in an FEC-coded Ethernet frame, wherein the FEC-coded Ethernet frame includes a start sequence, a conventional Ethernet frame, a first delimiter, a number of FEC parity bits, and a second delimiter;
wherein the first delimiter is used to separate the conventional Ethernet frame from the FEC parity bits; and
wherein the FEC parity bits are calculated for the conventional Ethernet frame and the first delimiter;
the method comprising:
determining the length of the entire FEC-coded Ethernet frame;
determining the number of the FEC parity bits based on the length of the entire FEC-coded Ethernet frame; and
delineating the FEC parity bits from the conventional Ethernet frame and the first delimiter based on the number of the FEC parity bits.

26. The method of claim 25, further comprising checking the conventional Ethernet frame and the first delimiter against the FEC parity bits to correct any possible bit errors.

27. The method of claim 25, wherein the FEC parity bits are comprised of groups of FEC parity bits, each of which is of the same length and corresponds to a fixed-length block of bits from the conventional Ethernet frame and the first delimiter, wherein the last block may use padding to meet the fixed length; and
wherein determining the number of the FEC parity bits is based on the following calculation:

$$Z = \left\lceil \frac{X}{(m+n)} \right\rceil \cdot n$$

where
Z is the number of the FEC parity bits;
X is the length of the entire FEC-coded Ethernet frame;
m is the number of a block of bits from the conventional Ethernet frame and the first delimiter; based on which a group of FEC parity bits are calculated; and
n is the number of a group of FEC parity bits corresponding to a block of bits from the conventional Ethernet frame and the first delimiter.

28. An apparatus for delineating data in an FEC-coded Ethernet frame, wherein the FEC-coded Ethernet frame includes a start sequence, a conventional Ethernet frame, a first delimiter, a number of FEC parity bits, and a second delimiter;
wherein the first delimiter is used to separate the conventional Ethernet frame from the FEC parity bits; and
wherein the FEC parity bits are calculated for the conventional Ethernet frame and the first delimiter;
the apparatus comprising:
a counting mechanism configured to determine the length of the entire FEC-coded Ethernet frame;
a computing mechanism configured to determine the number of the FEC parity bits based on the length of the entire FEC-coded Ethernet frame; and
a delineating mechanism configured to delineate the FEC parity bits from the conventional Ethernet frame and the first delimiter based on the number of the FEC parity bits.

29. The apparatus of claim 28, further comprising a correcting mechanism configured to check the conventional Ethernet frame and the first delimiter against the FEC parity bits and to correct any possible bit errors.

30. The apparatus of claim 28, wherein the FEC parity bits are comprised of groups of FEC parity bits, each of which is of the same length and corresponds to a fixed-length block of bits from the conventional Ethernet frame and the first delimiter, wherein the last block may use padding to meet the fixed length; and
wherein to determine the number of the FEC parity bits, the computing mechanism is configured to perform the following calculation:

$$Z = \left\lceil \frac{X}{(m+n)} \right\rceil \cdot n$$

where
Z is the number of the FEC parity bits;
X is the length of the entire FEC-coded Ethernet frame;
m is the number of a block of bits from the conventional Ethernet frame and the first delimiter; based on which a group of FEC parity bits are calculated; and
n is the number of a group of FEC parity bits corresponding to a block of bits from the conventional Ethernet frame and the first delimiter.

* * * * *

UNITED STATES PATENT AND TRADEMARK OFFICE
CERTIFICATE OF CORRECTION

PATENT NO. : 7,152,199 B2
APPLICATION NO. : 10/866399
DATED : December 19, 2006
INVENTOR(S) : Hung C. Nguyen It is certified that error appears in the above-identified patent and that said Letters Patent is hereby corrected as shown below:

On The Title Page: Item (75) Inventors:
The first named inventor's name should read
--Hung C. Nguyen--.

Signed and Sealed this

Sixth Day of March, 2007

JON W. DUDAS
*Director of the United States Patent and Trademark Office*